United States Patent [19]

Sugimoto

[11] 4,001,518

[45] Jan. 4, 1977

[54] DISCRETE FOUR-CHANNEL DISC REPRODUCING SYSTEM

[75] Inventor: Yukio Sugimoto, Katano, Japan

[73] Assignee: Matsushita Electric Industrial Company, Ltd., Osaka, Japan

[22] Filed: Mar. 10, 1975

[21] Appl. No.: 556,875

[30] Foreign Application Priority Data

| | | |
|---|---|---|
| Mar. 12, 1974 | Japan | 49-28709 |
| Mar. 28, 1974 | Japan | 49-35333 |
| Apr. 10, 1974 | Japan | 49-41269 |
| Apr. 10, 1974 | Japan | 49-41270 |

[52] U.S. Cl. .................... 179/100.4 ST; 179/1 GQ; 179/100.1 TD; 179/100.4 M

[51] Int. Cl.² ........................ G11B 3/00; G11B 3/78

[58] Field of Search .......... 179/100.4 ST, 100.4 M, 179/100.1 TD, 1 GQ, 15 BT, 100.4 A, 100.4 C

[56] References Cited

UNITED STATES PATENTS

| | | | |
|---|---|---|---|
| 3,843,850 | 10/1974 | Takahashi et al. | 179/100.4 ST |
| 3,854,098 | 12/1974 | Takahashi et al. | 179/15 BT |
| 3,894,201 | 7/1975 | Pyles | 179/100.4 ST |
| 3,896,272 | 7/1975 | Takahashi et al. | 179/100.4 ST |
| 3,911,231 | 10/1975 | Sugimoto et al. | 179/100.4 ST |
| 3,911,232 | 10/1975 | Itoh | 179/100.4 ST |

*Primary Examiner*—Raymond F. Cardillo, Jr.
*Attorney, Agent, or Firm*—Stevens, Davis, Miller & Mosher

[57] ABSTRACT

A compatible discrete four-channel (CD-4) stereophonic reproducing system which comprises a detecting circuit for detecting a sub-channel signal. A control means detects an over-deviation of the sub-channel signal and deactivates a noise elimination switching circuit connected in a stage following the detecting circuit when the over-deviation signal appears, thereby preventing an output from being transmitted from the detecting circuit to succeeding stages. A distortion reducing circuit is also provided. This circuit is responsive to an output of said control means for attenuating at least a high frequency band of an output of the switching circuit for a predetermined time period, this period being longer than the period for which the over-deviation signal appears. Consequently, the noise produced by various causes can be effectively eliminated.

7 Claims, 7 Drawing Figures

DISCRETE FOUR-CHANNEL DISC REPRODUCING SYSTEM

The present invention relates to an improvement in a four-channel stereophonic reproducing system, and more particularly to a compatible discrete four-channel (CD-4) disc reproducing system which permits high quality reproduction with a simple circuit configuration.

In the CD-4 disc reproducing system which has been developed by the Nippon Victor Company in Japan and accepted as a four-channel standard by the EIA (Electronic Industries Association) and the RIAA (Recording Industry Association of America), when a record disc wears sufficiently to cause a large reduction of the level of a sub-carrier signal, the signal to noise (S/N) ratio for a sub-channel signal (which is derived by FM detecting the sub-carrier wave signal), is substantially lowered. In this case, since a main-channel signal is reproduced substantially normally, the sub-channel signal of low quality has been blocked in order to maintain an overall reproducing quality at the expense of the separation of a front signal and a rear signal. Further, when the sub-carrier wave signal is not reproduced with high fidelity for some reason, such as that caused by the tracing characteristic of a pickup needle and the shape at the tip end thereof, the sub-carrier wave signal may be missing over a certain section. In such a case, the section from which the sub-carrier wave signal is missing is subjected to a substantial FM deviation which causes a substantial pulsive noise in the sub-channel signal after FM-detection. Among many approaches to eliminate this noise is the application of a switching pulse signal produced in synchronism with the section to a switching circuit arranged in a sub-channel signal path to block the sub-channel signal for a period corresponding to the section producing the noise.

When the sections from which the sub-carrier wave signals is missing occur frequently in successive manner, the switching pulse signals each produced in synchronism with the respective sections are applied to the switching circuit arranged in the sub-channel signal path to entirely block a high frequency band or a whole frequency band in those sections.

It is an object of the present invention to provide a CD-4 disc reproducing system which permits effective elimination of noise produced by various causes with a simple circuit configuration and at low cost.

It is another object of the present invention to provide a CD-4 disc reproducing system which permits high performance reproduction for a four-channel disc system with a simple circuit configuration.

In accordance with the present invention, a four-channel disc reproducing system is provided which comprises a detecting circuit for detecting a sub-channel signal. A control means detects to an over-deviation of the sub-channel signal and deactivates a noise elimination switching circuit connected in a stage following the detecting circuit when the over-deviation signal appears, thereby preventing an output from being transmitted from the detecting circuit to succeeding stages. A distortion reducing circuit is also provided. This circuit is responsive to an output of the control means for attenuating at least a high frequency band of an output of the switching circuit for a predetermined time period, this period being longer than the period for which the over-deviation signal appears.

According to an aspect of the present invention, the system is so arranged that the overdeviation is detected to block the signal path for the sub-channel signal for the period of the detection of the over-deviation and to lower the level of the sub-channel signal for a predetermined time period after said blocking interval, whereby the distortion component which may be additionally produced by blocking the signal path is also effectively attenuated, resulting in a high performance four-channel stereophonic reproducing system.

According to another aspect of the present invention, the system is so arranged that the overdeviation of the sub-channel signal after having been detected is detected in an averaging mode and a detected output thereof operates the distortion reducing circuit, an output of which controls the turn-on and turn-off of pilot lamps of the four-channel disc system, whereby a high performance display for a four-channel disc system is attained with a simple configuration and stable operation.

According to a further aspect of the present invention, the system is so arranged that muting at the level of the sub-channel signal, long-time muting where the noise elimination is frequently effected and muting at the level of the sub-carrier wave signal are performed collectively in a common distortion reducing circuit, whereby the sub-channel signal path is blocked with a simple circuit configuration to effectively eliminate the noise component possibly produced during reproduction to permit a high quality reproduced sound.

The other objects, features and advantages of the present application will become more apparent from the following detailed description of the preferred embodiments of the present invention when taken in conjunction with the accompanying drawings, in which.

Figure 3:
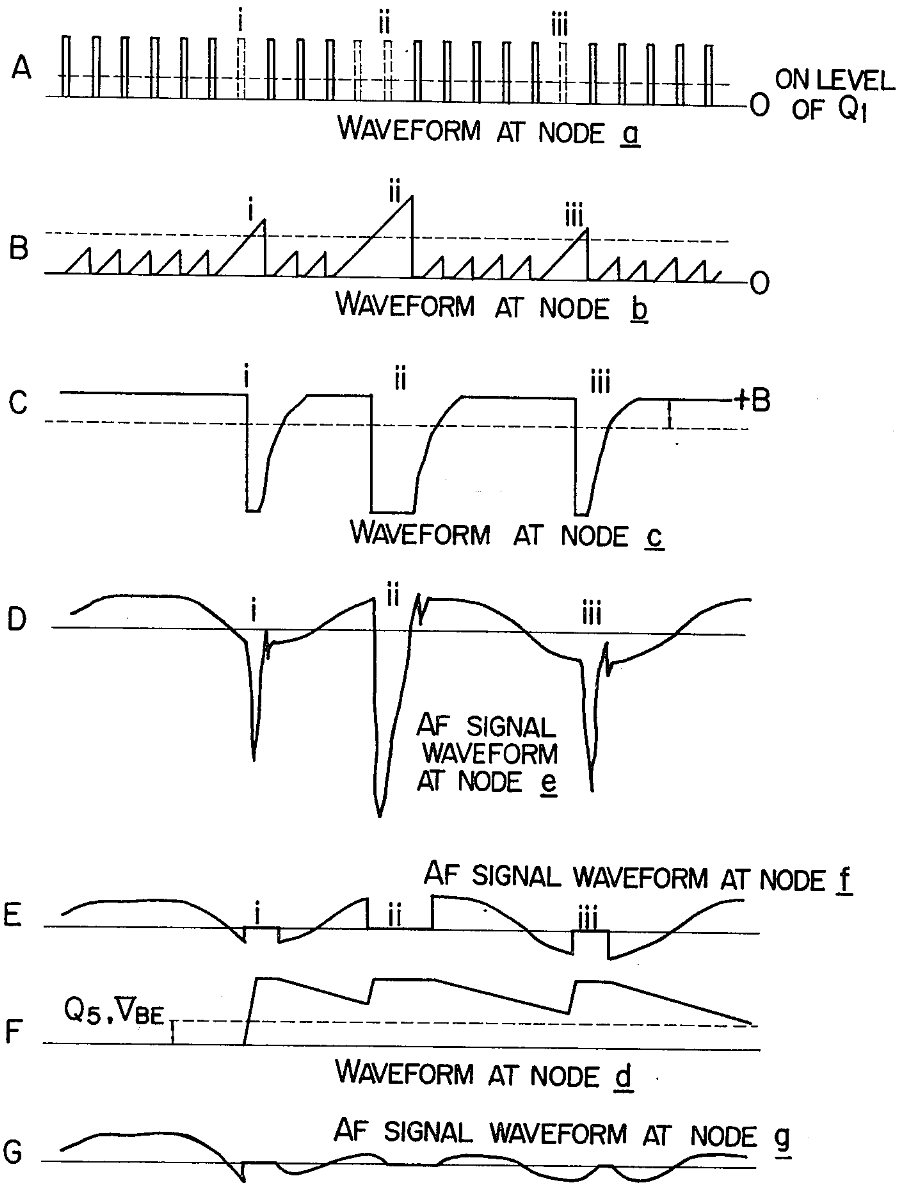

FIG. 3, consisting of FIGS. A through G, shows waveforms for explaining the operation thereof.

Figure 4:
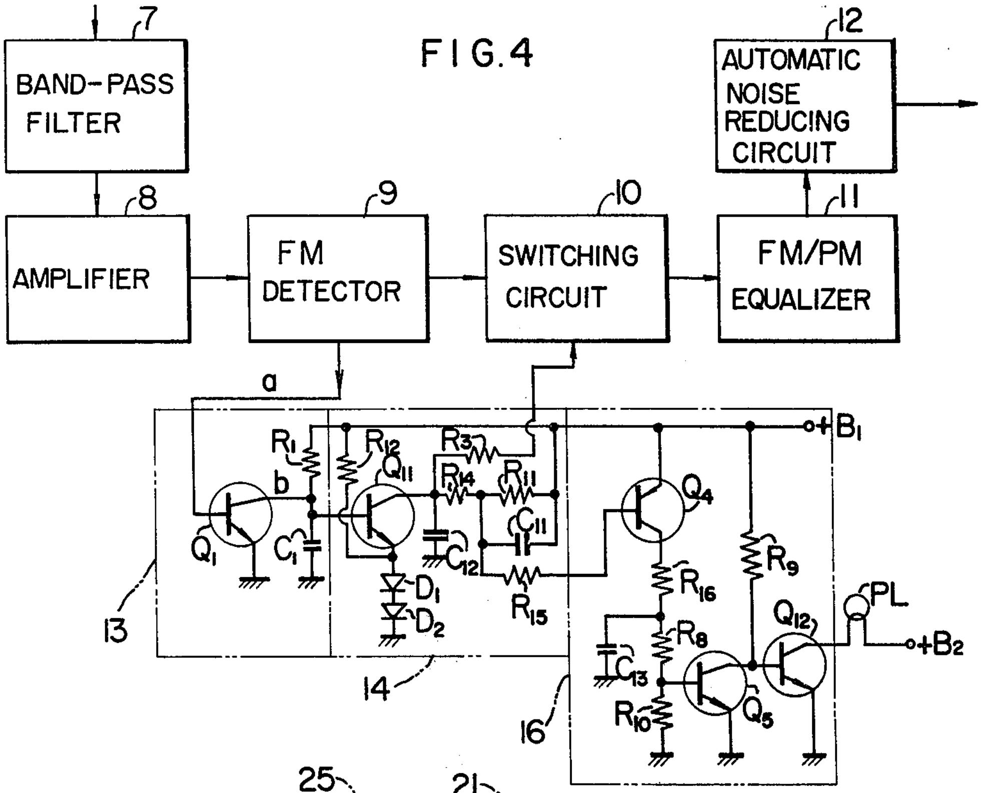

FIG. 4 is a circuit diagram of a main portion of a modified form of the system.

Figure 5:
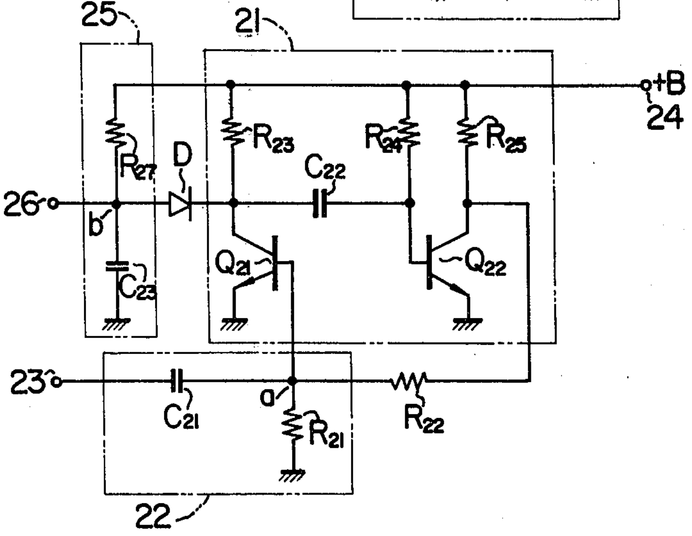

FIG. 5 is a circuit diagram of a main portion of another modified form of the system.

Figure 6:
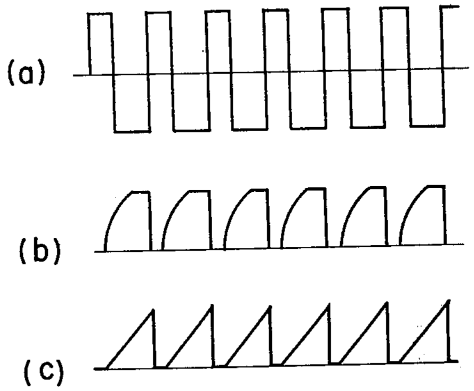

FIG. 6, consisting of FIGS. A through C, shows waveforms for explaining the operation thereof.

Figure 7:
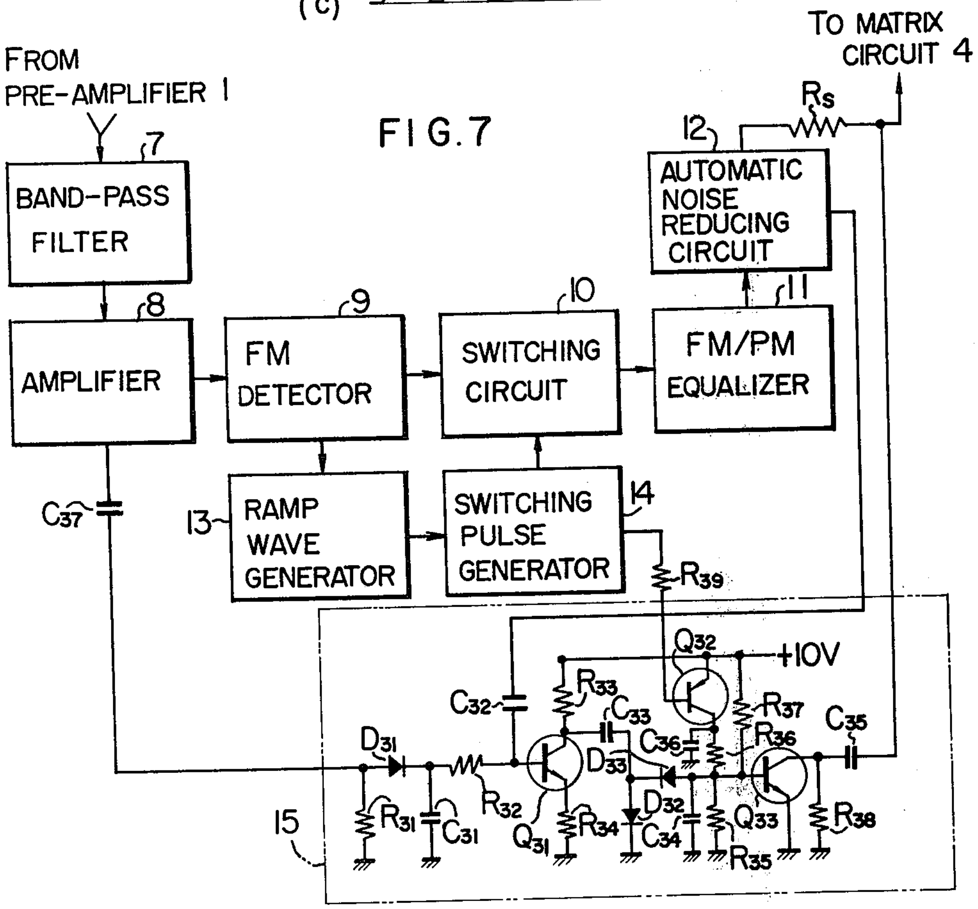

FIG. 7 is a circuit diagram of a main portion of another modified form of the system.

The preferred embodiments of the present invention will now be described with reference to the drawings.

Figure 1:
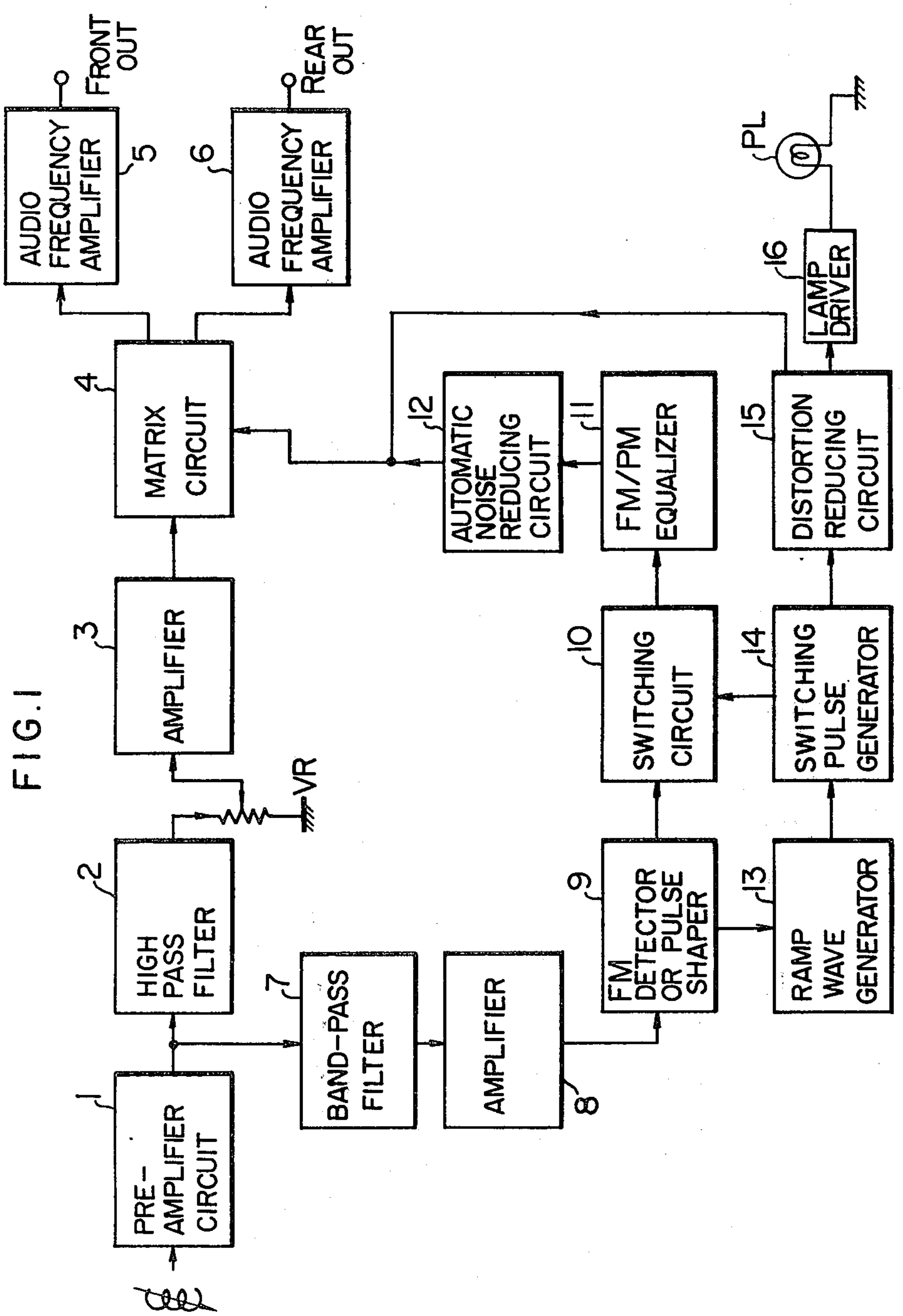
FIG. 1 shows a block diagram illustrating one embodiment of a four-channel disc reproducing system in accordance with the present invention.

FIG. 1 shows a block diagram illustrating either left or right channel reproducing sub-systems in one embodiment of the four-channel stereophonic reproducing system of the present invention. In the figure, 1 designates a pre-amplifier circuit, 2 a high pass filter circuit for passing only a main channel signal in the amplified output from the preamplifier circuit 1, VR a variable resistor for adjusting the separation, 3 an amplifier circuit for amplifying the main channel signal, 4 a matrix circuit, 5 and 6 audio frequency amplifier circuits for amplifying a front signal and a rear signal, respectively, derived from the matrix circuit 4, 7 a band pass filter circuit for passing only a sub-channel signal in the amplified output from the pre-amplifier circuit 1, 8 an amplifier circuit for amplifying the subcarrier signal passed through the band pass filter circuit 7, 9 an FM detector or a detector circuit comprising a pulse count detector including a pulse shaper circuit, a differentiating circuit and a low pass filter, 10 a noise elimination switching circuit, 11 an FM/PM equalizer, 12 an automatic noise reducing circuit, 13 a ramp wave generator circuit for detecting an over-deviation, 14 a switching pulse generating circuit for generating a switching pulse to control the noise elimination switching circuit 10 in response to an input thereto from the output of the ramp wave generating circuit 13, 15 a distortion reducing circuit for attenuating additional distortion components appearing at an output of the automatic noise reducing circuit 12 in response to an input thereto from the output of the switching pulse generating circuit 14, PL a pilot lamp for the display of the four-channel disc system and 16 a lamp driving circuit.

Figure 2:
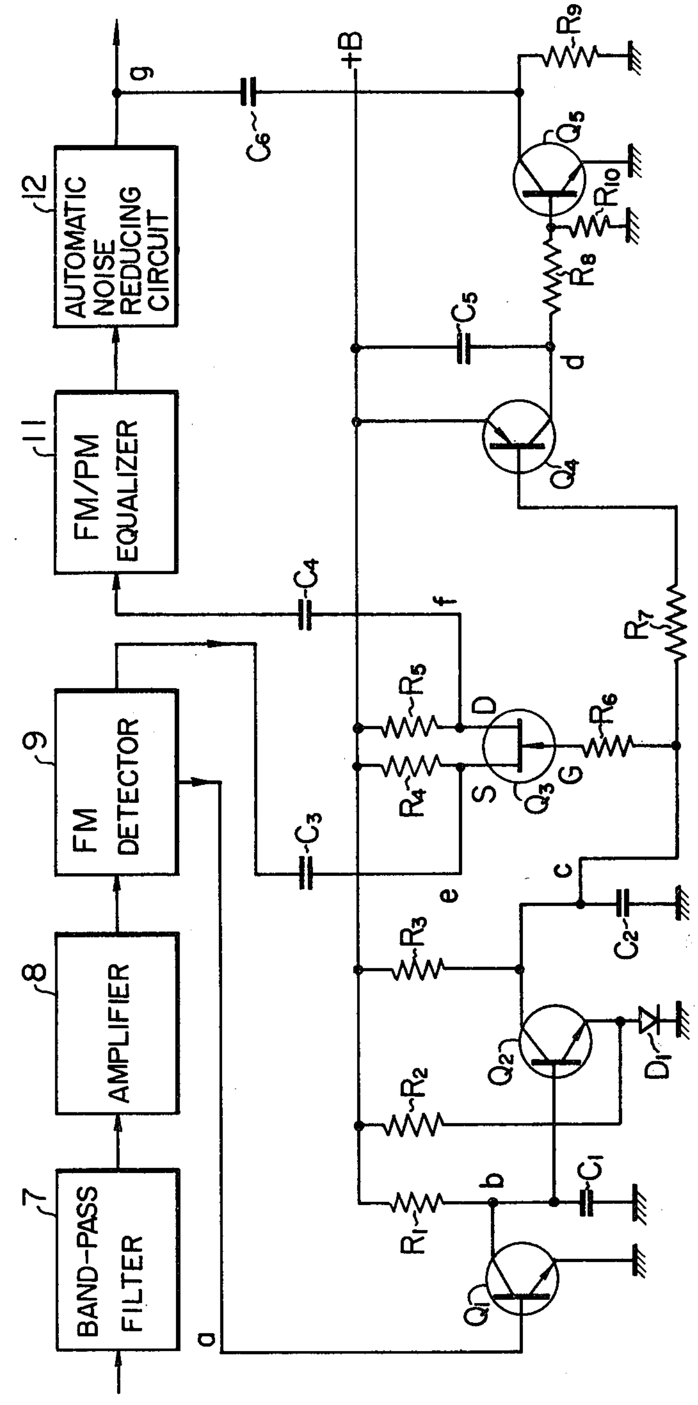
FIG. 2 shows a circuit diagram of a main portion of the system shown in FIG. 1.

FIG. 2 specifically shows a main portion of the system shown in FIG. 1, in which $Q_1$, $R_1$ and $C_1$ designate a transistor, a resistor and a capacitor, respectively, constituting the ramp wave generating circuit 13 for detecting the over-deviation; $Q_2$, $R_2$, $R_3$, $C_2$ and $D_1$ designate a transistor, resistors, a capacitor and a diode, respectively, constituting the switching pulse generating circuit 14; $Q_3$, $R_4$, $R_5$ and $R_6$ designate a field effect transistor and resistors, respectively, constituting the noise elimination switching circuit 10; and $Q_4$, $Q_5$, $R_7$, $R_8$, $R_9$, $R_{10}$, $C_5$ and $C_6$ designate transistors, resistors and capacitors, respectively, constituting the distortion reducing circuit 15.

In the present embodiment, the CD-4 signal amplified by the pre-amplifier circuit 1 is separated by the high pass filter circuit 2 and the band pass filter circuit 7 into the main channel signal and the sub-channel signal. The main channel signal passed through the high pass filter circuit 2 is applied through the variable resistor VR for adjusting the separation and the amplifier circuit 3 to the matrix circuit 4, while the sub-channel signal passed through the band pass filter circuit 7 is applied through the amplifier circuit 8 to the detector circuit 9 where it is detected and the detected signal is then applied through the switching circuit 10, the equalizer 11 and the automatic noise reducing circuit 12 to the matrix circuit 4. In this manner the front and rear audio output signals are separately produced at the output terminals of the matrix circuit 4. In the CD-4 system, however, the sub-channel signal frequently includes noise due to dust deposited on a record disc, the dust tending to bring about deterioration of separation and increased noise. To overcome the above difficulty, in the present embodiment, the sub-channel signal is converted into a shaped pulse train by the detection circuit 9, and the pulse train is applied to the ramp wave generating circuit 13, the output of which triggers the switching pulse generating circuit 14, the output of which in turn controls the noise elimination switching circuit 10. The output of the switching pulse generating circuit 14 is also applied to the distortion reducing circuit 15 to reduce the noise component additionally appearing at the output of the automatic noise reducing circuit 12.

The functions of the noise elimination and the distortion reduction will now be described in detail with reference to FIGS. 2 and 3.

Referring to FIG. 3, A designates a pulse train derived by shaping the sub-carrier signal by the detection circuit 9 and the sections *i*, *ii* and *iii* represent states of the sub-carrier signal interrupted by some cause (for example, as dust). In the normal state 1 the number of pulses in the pulse train corresponds to the frequency of the sub-carrier signal, but when high fidelity reproduction is not attained because of the dust deposited on the record disc the pulses in the corresponding sections are missed as shown in sections *i*, *ii* and *iii*. In such a case it follows that the sub-carrier wave is subjected to a considerable frequency deviation of minus polarity. If such a signal is detected without any compensation, a substantial pulsive noise appears as shown in FIG. 3D.

The pulse train as shown in FIG. 3A produced in this manner is applied to the base of the transistor $Q_1$ which constitutes a part of the ramp wave generating circuit 13. Thus, the transistor $Q_1$ is turned on when a pulse is applied thereto and a charge stored in the capacitor $C_1$ is instantaneously discharged through the transistor $Q_1$. When the applied pulse is terminated the transistor $Q_1$ is turned off and the capacitor $C_1$ is gradually charged up through the resistor $R_1$ until the next pulse is applied to the transistor $Q_1$. As a result, at the junction *b* of the capacitor $C_1$ and the resistor $R_1$, a ramp wave as shown in FIG. 3B appears. The ramp wave appearing at the junction *b* is then applied to the base of the transistor $Q_2$ which constitutes a part of the switching pulse generating circuit 14. The operating level of the transistor $Q_2$ which constitutes a part of the switching pulse generating circuit 14 is determined by the sum of the voltage across the diode $D_1$ and the base-emitter voltage $V_B$ of the transistor $Q_2$. Assuming that the operating level is set to a level shown by a dashed line in FIG. 3B, the transistor $Q_2$ is turned on only in the sections *i*, *ii* and *iii*. When the transistor $Q_2$ is turned on, the charge stored in the capacitor $C_2$ is abruptly discharged through the transistor $Q_2$ so that the potential at a junction *c* of the capacitor $C_2$ and the resistor $R_3$ falls. In the areas other than the sections *i*, *ii* and *iii*, the transistor $Q_2$ is in its off state and the capacitor $C_2$ is gradually charged through the resistor $R_3$ so that the potential at the junction *c* of the capacitor $C_2$ and the resistor $R_3$ gradually rises. As a result the potential at the junction *c* of the capacitor $C_2$ and the resistor $R_3$ changes in a manner as shown in FIG. 3C. This potential charge is applied through the resistor $R_6$ to a gate of the field effect transistor $Q_3$ which constitutes a part of the noise elimination switching circuit 10. Since the source and drain of the field effect transistor $Q_3$ are connected to a +B supply through the resistors $R_4$ and $R_5$, respectively, when said potential is applied to the gate of the field effect transistor $Q_3$ it is turned off for the periods corresponding to the sections *i*, *ii* and *iii* so that the transmission of the output of the detection circuit 9 to the equalizer 11 is inhibited for those intervals. As a result, the waveform at an input of the equalizer comprises, as shown in FIG. 3E, the waveform shown in FIG. 3D excluding only those sections in which the troubles occured (i.e. the sections *i*, *ii* and *iii*). Thus it is possible to reduce a large pulsive noise.

On the other hand, as seen from the waveform shown in FIG. 3E, the resulting signal waveform includes many interrupted portions, which in turn cause additional distortion components to appear. To overcome the above difficulty, in the present embodiment, the output of the switching pulse generating circuit 14 is applied to the distortion reducing circuit 15 to reduce the distortion component therein. More particularly, when the output of the switching pulse generating circuit 14 as shown in FIG. 3C is applied to the base of the transistor $Q_4$ which constitutes a part of the distortion reducing circuit 15, the transistor $Q_4$ is turned on for the intervals corresponding to the sections *i*, *ii* and *iii* shown in FIG. 3 so that the charge stored in the capacitor $C_5$ is abruptly discharged through the transistor $Q_4$. After the sections *i*, *ii* and *iii* have been passed the transistor $Q_4$ is turned off and the capacitor $C_5$ is gradually charged through the resistors $R_8$ and $R_{10}$ so that the potential at the junction *d* of the capacitor $C_5$ and the resistor $R_8$ changes as shown in FIG. 3F. Since this potential change is applied to the base of the transistor $Q_5$, the collector-to-emitter impedance of the transistor $Q_5$ is greatly reduced in the intervals corresponding to the sections i, ii and iii plus predetermined additional time intervals. As a result, the output appearing at the output *g* of the automatic noise reducing circuit 12 is substantially grounded through the capacitor $C_6$ so that the high frequency band may be considerably attenuated. Consequently the output appearing at the output terminal *g* of the automatic noise reducing circuit 12 produces a waveform as shown in FIG. 3G in which the distortion component additionally produced by the switching circuit 10 has been reduced.

By proper selection of the capacitance of the capacitor $C_6$ it is possible to reduce the distortion component over an entire frequency band.

FIG. 4 specifically shows a modification of the main part of the system shown in FIG. 1, in which the same reference characters as those used in FIG. 2 represent the same components. $Q_{11}$, $R_{11}$, $R_{12}$, $R_{13}$, $R_{14}$, $R_{15}$, $C_{11}$, $C_{12}$, $D_1$ and $D_2$ designate a transistor, resistors, capacitors and diodes, respectively, constituting the switching pulse generating circuit 14, $Q_{12}$ designates a driving transistor for the pilot lamp PL which is driven by the output of the distortion reducing circuit 15 to effect the display for the four-channel disc system.

The operation of the display for the four-channel disc system will now be described below with reference to FIG. 4.

During the record reproduction in the CD-4 system, the sub-carrier signal, which has been amplified by the pre-amplifier circuit 1 and separated by the band pass filter circuit 7 and further amplified by the amplifier circuit 8, is applied to the detection circuit 9 to produce the pulse train shown in FIG. 3A. The pulse train is then applied to the base of the transistor $Q_1$ which constitutes a part of the ramp wave generating circuit 13. Thus, the transistor $Q_1$ is turned on when the pulse is applied thereto and the charge stored in the capacitor $C_1$ is momentarily discharged through the transistor $Q_1$. When the application of the pulse is terminated, the transistor $Q_1$ is turned off so that the capacitor $C_1$ is gradually charged through the resistor $R_1$ until the next pulse is applied to the transistor $Q_1$. In this manner at the junction *b* of the capacitor $C_1$, the resistor $R_1$ and the collector of the transistor $Q_1$ a ramp wave signal as shown in FIG. 3B is generated. This ramp wave signal is applied to the base of the transistor $Q_{11}$ which constitutes a part of the switching pulse generating circuit 14. The operating level of the transistor $Q_{11}$ is determined by the voltages across the diodes $D_1$ and $D_2$ and the base-emitter voltage of the transistor $Q_4$. When the operating level is set to the level shown by the dashed line in FIG. 3B, the transistor $Q_{11}$ is turned off.

When the transistor $Q_{11}$ is turned off, no current flows between the collector and the emitter of the transistor $Q_{11}$ so that no D.C. voltage drop appears across the resistor $R_{11}$. Consequently, the transistor $Q_4$ has no input voltage applied to its base and hence is turned off. The transistor $Q_5$ is also turned off. By the turn-off of the transistors $Q_4$ and $Q_5$ the collector potential of the transistor $Q_5$ rises so that the transistor $Q_{12}$ which constitutes a part of the lamp driving circuit is turned on. As a result, current flows through the pilot lamp PL. By this operation of the lamp a display for the four-channel disc system is attained during record reproduction by the CD-4 system.

During the state other than record reproduction in the CD-4 system, the transistor $Q_1$ which constitutes a part of the ramp wave generating circuit 13 is turned off because no pulse train as an input signal is applied to the base thereof. The transistor $Q_{11}$ which constitutes a part of the switching pulse generating circuit 14 is turned on because the +B supply is applied through the resistor $R_1$ to the base thereof. Consequently, because of the voltage drop across the resistor $R_{11}$ the transistors $Q_4$ and $Q_5$ are turned on and the transistor $Q_{12}$ is turned off. Thus, the pilot lamp PL is not lit.

In the display for the CD-4 system, carrier drop-out may occur due to certain cartridge characteristics or wear of the record disc and certain pulses in the pulse train applied to the base of the transistor $Q_1$ (which constitutes the ramp wave generating circuit) 13 are missed during the interval of the carrier drop-out. When certain pulses in the pulse train are missed the collector potential of the transistor $Q_1$ rises to such an extent that it exceeds a level for the detection of the deviation by the transistor $Q_{11}$. As a result, the transistor $Q_{11}$ is turned on only during that interval and a pulsive signal is produced at the collector of the transistor $Q_{11}$. By this pulsive signal the transistor $Q_4$ is turned on, but the transistor $Q_5$ is not turned on by the time constant circuit of the resistor $R_{16}$ and the capacitor $C_{13}$. In this manner, in the display for the CD-4 system, a malfunction of the circuit may occur due to the wear of the record disc or dust deposited thereon. In order to overcome the above difficulty, in the present modification, a capacitor $C_{11}$ is connected in parallel with the resistor $R_{11}$ (which constitutes a part of the switching pulse generating circuit 14) to prevent the malfunction due to short-term carrier drop-out, while a malfunction due to longer-term carrier dropout can be prevented by a time constant circuit of the resistor $R_{16}$ and the capacitor $C_{13}$ which constitute the lamp driving circuit 16. More particularly, when the collector-to-emitter potential of the transistor $Q_1$ (which constitutes a part of the ramp wave generating circuit 13) becomes sufficiently higher than the sum of the base-to-emitter voltage of the transistor $Q_{11}$ (which constitutes a part of the switching pulse generating circuit 14) and the voltages across the diodes $D_1$ and $D_2$ because of the carrier dropout, and the transistor $Q_4$ (which constitutes a part of the lamp driving circuit 16) is turned on, the voltage across the capacitor $C_{13}$ gradually rises and the voltage is divided by the resistors $R_8$ and $R_{10}$ and is applied to the base of the transistor $Q_5$. With this circuit configuration, by proper selection of the time constant of the resistor $R_{16}$ and the capacitor $C_{13}$ as well as the dividing ratio of the resistors $R_8$ and $R_{10}$, it is possible to prevent malfunction of the pilot lamp PL which would otherwise be caused by occasional carrier drop out.

Considering next record reproduction in a two-channel system, there exists a problem of malfunction caused by the introduction of harmonic signals. In this case, even if the transistor $Q_{11}$ is occasionally turned off by the harmonic signal, the transistor $Q_4$ is not turned off by the virtue of the time constant of the capacitor $C_{11}$ and the resistor $R_{11}$. Even in the worst case where the transistor $Q_4$ is turned off, the transistor $Q_5$ is not turned off by virtue of the time constant of the resistors $R_{16}$, $R_8$, $R_{10}$ and the capacitor $C_{13}$ so that the pilot lamp PL is not lit.

FIG. 5 shows a modification of the ramp wave generating circuit 13 shown in FIG. 1, in which 21 designates a monostable multivibrator circuit consisting of transistors $Q_{21}$, $Q_{22}$, resistors $R_{23}$, $R_{24}$, $R_{25}$ and a capacitor $C_{22}$, 22 designates a differentiating circuit consisting of a resistor $R_{21}$ and a capacitor $C_{21}$, 23 designates an input terminal to which an input square wave signal as shown in FIG. 6(*a*) is applied and 24 designates a +B power supply terminal. The junction *a* of the resistor $R_{21}$ and the capacitor $C_{21}$ (which constitutes the differentiating circuit 22) is connected to the base of one transistor $Q_{21}$ (which constitutes a part of the monostable multivibrator circuit 21) and also connected to the collector of the other transistor $Q_{22}$ through the resistor $R_{22}$. The collector of said one transistor $Q_{21}$ which constitutes a part of the monostable multivibrator circuit 21 is connected to the junction *b* of the resistor $R_{27}$ and capacitor $C_{23}$ (which constitute the time constant circuit 25) through the switching diode D. 26 designates an output terminal.

With the monostable multivibrator circuit 21 of the above construction, the transistor $Q_{21}$ is normally nonconducting while the transistor $Q_{22}$ is normally conducting.

With a ramp wave generating circuit of such construction, a square wave signal as shown in FIG. 6(*a*) applied to the input terminal 23 is converted to a pulse signal by the differentiating circuit 22 and applied to the transistors $Q_{21}$ and $Q_{22}$. When the pulse signal is applied to the base of the transistor $Q_{21}$, it is rendered conductive for a duration determined by the resistor $R_{23}$ and the capacitor $C_{22}$ which constitute a part of the monostable multivibrator circuit 21. When the transistor $Q_{21}$ is turned on, the switching diode D is rendered conductive so that the anode potential thereof becomes substantially zero volts.

Next, when application of the pulse signal to the base of the transistor $Q_{21}$ is terminated and the transistor $Q_{21}$ is rendered non-conductive, the switching diode D is rendered non-conductive and the voltage across the capacitor $C_{23}$ rises gradually in accordance with the time constant determined by the resistor $R_{27}$ and the capacitor $C_{23}$ until the next pulse signal is applied to the base of the transistor $Q_{21}$. Then, when the pulse signal as described above is applied to the base of the transistor $Q_{21}$ to render the transistor $Q_{21}$ conductive, the switching diode D is rendered conductive and the anode potential thereof becomes substantially zero volts.

In this manner, by controlling the switching of the normally non-conducting transistor $Q_{21}$ in the monostable multivibrator circuit 21 by the pulse signal from the differentiating circuit 22, the collector potential of the transistor $Q_{21}$ changes as shown by the waveform of FIG. 6(*b*). The switching operation of the transistor $Q_{21}$, shown in FIG. 6(*b*), corresponds to the operation of the switching diode D. Thus, by controlling the time constant circuit 25 by the switching operation of the switching diode D, a ramp wave signal as shown in FIG. 6(*c*) is produced at the output terminal 26.

FIG. 7 shows a modification of the distortion reducing circuit 15 shown in FIG. 1, in which $Q_{31}$, $Q_{32}$ and $Q_{33}$ designate transistors, $C_{31}$, $C_{32}$, $C_{33}$, $C_{34}$, $C_{35}$ and $C_{36}$ designate capacitors, $R_{31}$, $R_{32}$, $R_{33}$, $R_{34}$, $R_{35}$, $R_{36}$, $R_{37}$ and $R_{38}$ designate resistors, and $D_{31}$, $D_{32}$ and $D_{33}$ designate diodes, all of which constitute a part of the modified distortion reducing circuit 15.

In the present modification, the output of the detection circuit 9 noise component applied to the ramp wave generating circuit 13 for detecting an overdeviation, and the detected output is used to trigger the switching pulse generating circuit 14, the output of which in turn controls the noise elimination switching circuit 10. The output of the switching pulse generating circuit 14 is also applied to the distortion reducing circuit 15 to entirely block the noise producing sections. Further, the output of the automatic noise reducing circuit 12 is applied to the distortion reducing circuit 15 to block the noise component included in the level of the sub-channel signal. Moreover, the output from the amplifier circuit 8 for the subcarrier wave signal is also applied to the distortion reducing circuit 15 to block the noise included in the level of the subcarrier wave signal.

The function of the noise elimination circuit will now be described.

Since the transistor $Q_{33}$ which constitutes a part of the distortion reducing circuit 15 is normally positively biased through the resistors $R_{35}$ and $R_{37}$, it is in the "on" state. When a portion of the sub-channel signal from the automatic noise reducing circuit 12 is applied to the base of the transistor $Q_{31}$ (which constitutes a part of the distortion reducing circuit 15), it is amplified by the transistor $Q_{31}$ if the latter is properly biased. The sub-channel signal portion is then rectified by the diodes $D_{32}$ and capacitor $C_{34}$ charged by $D_{33}$ and the rectified output. Then, because of the voltage drop across the resistor $R_{35}$ the transistor $Q_{33}$ is now negatively biased so that the transistor $Q_{33}$ is turned off. Under this condition, if the level of the sub-channel signal at the input to the transistor $Q_{31}$ falls for some cause, the transistor $Q_{33}$ is turned on and it is shunted to the sub-channel signal path through the capacitor $C_{35}$.

On the other hand, the sub-carrier wave signal, which has been amplified by the amplifier circuit 8, is applied to the diode $D_{31}$ through the capacitor $C_{37}$, rectified by the diode $D_{31}$ and then applied to the time constant circuit comprising capacitor $C_{31}$ and resistor $R_{32}$. The rectified output is used to bias the transistor $Q_{31}$. Under this condition, if the level of the sub-carrier signal from the amplifier circuit 8 falls for some reason, the bias to the transistor $Q_{31}$ is lowered so that the transistor $Q_{31}$ is turned off and no amplification is attained thereby. Since the output of the transistor $Q_{31}$ disappears even if the output from the automatic noise reducing circuit 12 is large, the transistor $Q_{33}$ is positively biased through the resistors $R_{35}$ and $R_{37}$ so that the transistor $Q_{33}$ is turned on. Consequently, it is shunted to the sub-channel signal path through the capacitor $C_{35}$.

Further, the output of the switching pulse generating circuit 14 is applied through the resistor $R_{39}$ to the base of the transistor $Q_{32}$ which constitutes a part of the distortion reducing circuit 15. Since the emitter of the transistor $Q_{32}$ is connected to the +B power supply, when the switching pulse is applied to the transistor $Q_{32}$ through the resistor $R_{39}$, it is turned on. The switching pulse is integrated in the time constant circuit of the resistor $R_{36}$ and the capacitor $C_{36}$ connected to the collector of the transistor $Q_{32}$ and the transistor $Q_{33}$ is heavily positively biased.

Under this condition, even if the rectified output of the diodes $D_{32}$ and $D_{33}$ is large the transistor $Q_{33}$ remains in its "on" state. Consequently, it is shunted to the sub-channel signal through the capacitor $C_{35}$.

In this manner it is possible to eliminate a sub-channel signal of low quality due to the fall of the level of the sub-carrier wave signal and also to eliminate the noise produced during the sub-carrier wave signal missing interval.

What is claimed is:

1. A four-channel stereophonic reproducing system for reproducing a CD-4 type four-channel record wherein a composite signal obtained from a first main channel signal constituted by a sum combination of first and second audio signals and a first subchannel signal constituted by a frequency or phase modulation of a difference combination of said first and second audio signals on a predetermined sub-carrier is recorded in one sound groove, and also wherein another composite signal obtained from a second main channel signal constituted by a sum combination of third and fourth audio signals and a second sub-channel signal constituted by a frequency or phase modulation of a difference combination of said third and fourth audio signals on a predetermined sub-carrier is recorded on another sound groove, said system comprising:

means for reproducing a main channel signal and a subchannel signal having a sub-carrier from each of said first and second composite signals recorded on said four-channel record;

detector means for detecting said sub-channel signals reproduced by said reproducing means;

matrix means for matrixing said main channel signals reproduced by said reproducing means and output signal from said detector means to produce four discrete stereophonic audio signals;

a noise elimination switching circuit provided between said detector means and said matrix means;

control means including a ramp wave generating circuit for converting the sub-channel signals from said detector means into triangular wave signals, and a switching pulse generating circuit responsive to the output of said ramp wave generating circuit for generating a switch pulse of a pulse width corresponding to an interval when a dropout of sub-carriers appears in said detected sub-channel signals, said control means on-off controlling said noise elimination switching circuit by the output of said switching pulse generating circuit to prevent application of the output of said detector means to said matrix means during the appearance of sub-carrier dropout; and distortion reducing means including a time constant circuit, said distortion reducing means being responsive to the output of said control means for attenuating an entire frequency band or at least a high frequency band of the output of said noise elimination switching circuit for a time period determined by the time constant circuit which is longer than the period of appearance of the sub-carrier dropout.

2. A system according to claim 1, which further comprises a band-pass filter circuit coupling said sub-channel signals to said detector means and an automatic noise reducing circuit; and wherein said distortion reducing means further includes a first transistor coupled to an output of said switching pulse generating circuit; a second transistor coupled to an output of said automatic noise reducing circuit and to said band-pass filter circuit through a first rectifier, said second transistor being biased by the rectified sub-carrier wave signal applied thereto; and a third transistor coupled to said first transistor through an integrator and to said second transistor through a second rectifier, said third transistor being forward biased by the integrated output of said first transistor and reverse biased by the rectified output of said second transistor, whereby when the level of the sub-carrier wave signal or the sub-channel signal or the sub-carrier wave signal during a certain period is lowered the output of said third transistor is connected to said automatic noise reducing circuit to block the sub-channel signal path so that the noise components produced at the fall of the levels of said respective signals may be reduced.

3. A system according to claim 1, wherein said distortion reducing means further includes a switching circuit output shunt circuit.

4. A system according to claim 1, in which said ramp wave generating circuit detects an over-deviation of the sub-channel signal caused by the appearance of sub-carrier dropout from the peak value of the triangular wave output, said switching pulse generating circuit including at its output side a time constant circuit having a small time constant to allow a short recovery time of the generated switching pulse, and the time constant circuit of said distortion reducing means having a relatively large time constant to shunt the output of said noise elimination switching circuit when the over-deviation successively occurs.

5. A system according to claim 4, wherein said ramp wave generating circuit comprises a monostable multivibrator including a normally non-conducting transistor, a time constant circuit including a resistor and a capacitor, and a switching diode coupled between said transistor and the junction of said resistor and capacitor, said switching diode being controlled by the turn-on and turn-off of said transistor, whereby a ramp wave output having a duration corresponding to an output pulse duration of said monostable multivibrator circuit is produced at said junction of said resistor and said capacitor constituting said time constant circuit.

6. A four-channel disc reproducing system according to claim 4, which comprises first and second time constant circuits connected to the output side of said switching pulse generating circuit, said first and said second time constant circuits respectively having a large and a small time constant and developing pulses of different pulse width in accordance with the rate of pulses generated by said switching pulse generating circuit for controlling the operation of said noise elimination switching circuit.

7. A system according to claim 4, which further comprises an indicator driving circuit coupled to said switching pulse generating circuit, said indicator driving circuit being responsive to the average d.c. voltage at the output of said switching pulse generating circuit for producing a drive signal for an indicator element.

* * * * *